(12) United States Patent
Goto et al.

(10) Patent No.: US 9,688,309 B2
(45) Date of Patent: Jun. 27, 2017

(54) SUSPENSION TOWER PLATE AND SUSPENSION TOWER

(71) Applicant: TOYOTA JIDOSHA KABUSHIKI KAISHA, Toyota-shi, Aichi-ken (JP)

(72) Inventors: Toshihiro Goto, Toyota (JP); Daisuke Itoh, Toyota (JP); Naoya Kosaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/913,490

(22) PCT Filed: Sep. 9, 2014

(86) PCT No.: PCT/IB2014/001760
§ 371 (c)(1),
(2) Date: Feb. 22, 2016

(87) PCT Pub. No.: WO2015/036829
PCT Pub. Date: Mar. 19, 2015

(65) Prior Publication Data
US 2016/0200361 A1    Jul. 14, 2016

(30) Foreign Application Priority Data
Sep. 11, 2013    (JP) .................................. 2013-188471

(51) Int. Cl.
*B62D 25/08*    (2006.01)
*B62D 21/11*    (2006.01)

(52) U.S. Cl.
CPC ............ *B62D 21/11* (2013.01); *B62D 25/088* (2013.01)

(58) Field of Classification Search
CPC ............................... B62D 21/11; B62D 25/088
USPC ........................ 296/203.01, 203.02, 193.09
See application file for complete search history.

(56) References Cited

U.S. PATENT DOCUMENTS

| | | | |
|---|---|---|---|
| 2013/0134742 A1* | 5/2013 | Mildner | B62D 25/088 296/203.02 |
| 2015/0166117 A1 | 6/2015 | Ohoka et al. | |
| 2015/0314811 A1* | 11/2015 | Shibata | B62D 25/082 296/193.09 |

FOREIGN PATENT DOCUMENTS

| | | |
|---|---|---|
| CN | 103042890 A | 4/2013 |
| DE | 20 2009 000 455 U1 | 3/2009 |
| DE | 10 2008 050 297 A1 | 5/2009 |
| DE | 10 2009 040 322 A1 | 3/2011 |
| JP | H06-218442 A | 8/1994 |
| JP | H10-316026 A | 12/1998 |
| JP | 2002-362417 A | 12/2002 |
| JP | 2007-131028 A | 5/2007 |

(Continued)

*Primary Examiner* — Dennis H Pedder
(74) *Attorney, Agent, or Firm* — Oliff PLC

(57) ABSTRACT

In a suspension tower plate, in a plate body that is made of a sheet metal and is a part of an upper wall portion of a suspension tower, three suspension fixing portions are disposed. Three suspension fixing portions fix to an upper end part of a suspension. Further, in the plate body, a bend portion is disposed on an outer periphery side of the three suspension fixing portions. In the suspension fixing portion and the bend portion like this, strain is likely to be generated by an upward load that is input from the suspension. However, in the suspension tower plate, the suspension fixing portion and the bend portion thick portions are disposed. Thick portions are thicker than the plate body.

7 Claims, 8 Drawing Sheets

(56) References Cited

FOREIGN PATENT DOCUMENTS

| | | |
|---|---|---|
| JP | 2009-292226 A | 12/2009 |
| JP | 2010-023560 A | 2/2010 |
| JP | 2010-247199 A | 11/2010 |
| JP | 2013-082387 A | 5/2013 |
| WO | 2013/180025 | 7/2013 |
| WO | 2014/097515 | 4/2014 |

\* cited by examiner

F I G . 6
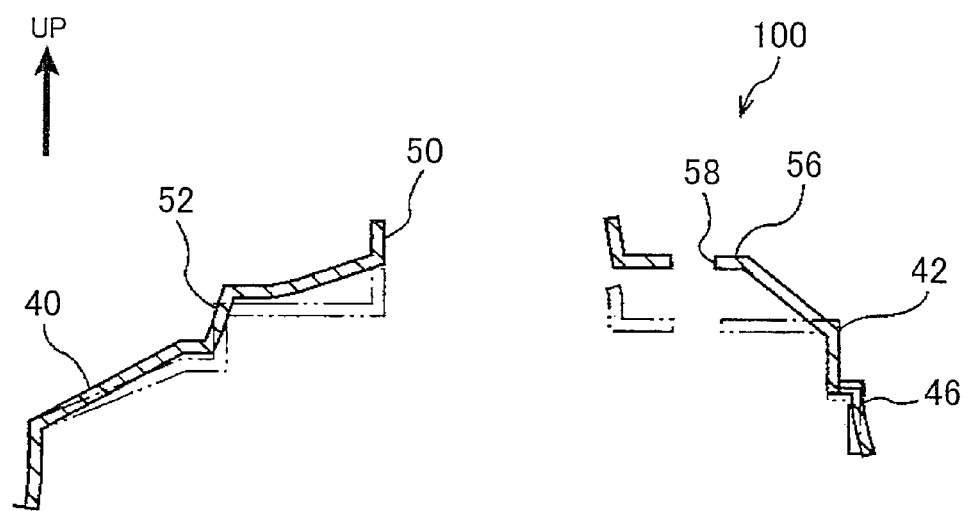

SUSPENSION TOWER PLATE AND SUSPENSION TOWER

BACKGROUND OF THE INVENTION

1. Field of the Invention

The present invention relates to a suspension tower plate disposed in an upper end part of a suspension tower and the suspension tower.

2. Description of Related Art

In a vehicle body front part structure described in the following Japanese Patent Application Publication No. 10-316026 (JP 10-316026 A), in a horizontal surface part disposed at an upper end part of a front suspension tower, a front spring support plate (hereinafter, referred to as a suspension tower plate) is disposed. In the suspension tower plate, four insertion holes through which four pieces of bolts disposed at the upper part of a front suspension are inserted are formed. A constitution in which a front shock absorber is fixed to the suspension tower plate with these four pieces of bolts described above is formed.

In the vehicle body front part structure such as described above, an upward load from a front tire during drive of a vehicle is input to the suspension tower plate via the front suspension. Therefore, from the viewpoint of improving drive stability of the vehicle, it is requested to secure stiffness of the suspension tower plate.

SUMMARY OF THE INVENTION

The present invention provides a suspension tower plate that can efficiently secure stiffness against an upward load from a suspension and a suspension tower.

A suspension tower plate according to an aspect of the invention includes a plate body made of a sheet metal, the plate body being a part of an upper wall portion of a suspension tower of a vehicle; a suspension fixing portion disposed in the plate body, the suspension fixing portion fixing to an upper end part of a suspension; a bend portion disposed on an outer periphery side of the suspension fixing portion in the plate body; and a thick portion being an entirety or a part in at least one of the suspension fixing portion and the bend portion, the thick portion being thicker than the plate body.

According to the suspension tower plate, the plate body made of a sheet metal, a the plate body the upper wall portion of the suspension tower of a vehicle includes the suspension fixing portion fixing the upper end part of the suspension. Further, the plate body includes the bend portion disposed on an outer periphery side of the suspension fixing portion. In such suspension fixing portion and bend portion, stress is likely to be generated by a upward load that is input from the suspension to the suspension fixing portion. However, in the suspension tower plate, an entirety or a part in at least one of the suspension fixing portion and the bend portion is the thick portion, the thick portion is thicker than the plate body. Thus, in the plate body, by forming a site that is particularly likely to generate strain thicker, while suppressing a mass from increasing, the stiffness can be efficiently secured.

Here, "a part" described in the explanation of the suspension tower plate means a part in an entirety, and the part that is divided into a plurality of places in the entirety is also included. Further, "a part" described in the explanation of the suspension tower plate means a part in which an increase in the stiffness can be recognized by constituting at least a part thereof into a thick portion and does not include a part that does not contribute to an increase in the stiffness. Further, the increase in the stiffness can be confirmed by an analysis that uses an electronic computer or the like.

The suspension tower plate may include the plate body including a convex portion that extends from a center side of the plate body to an outer periphery side, the convex portion disposed adjacent to the suspension fixing portion.

In the suspension tower plate, the convex portion is disposed adjacent to the suspension fixing portion of the plate body. Since, in this convex portion, a second moment of area in a thickness direction of the plate body is increased, surface stiffness of the plate body in the vicinity of the suspension fixing portion can be improved. This can contribute to effectively suppressing the plate body from being deforming due to the upward load from the suspension.

The suspension tower plate may include, the plate body may include a pair of the convex portions, the pair of the convex portions facing each other across the suspension fixing portion.

In the suspension tower plate, in the plate body, the convex portions are disposed on both sides of the suspension fixing portion and the upper end part of the suspension is fixed to the suspension fixing portion. This can contribute to effectively improving the surface stiffness of the plate body in the vicinity of the suspension fixing portion.

In the suspension tower plate, the thick portion may be disposed between the pair of convex portions in the plate body.

In the suspension tower plate, since, in the plate body, the thick portion is disposed between the pair of convex portions and the suspension fixing portion is disposed in the convex portions, this can contribute to further effectively improving the surface stiffness of the plate body in the vicinity of the suspension fixing portion.

In the suspension tower plate, the pair of convex portions may extend to the bend portion and the thick portion is disposed between the pair of convex portions in the bend portion.

In the suspension tower plate, the surface stiffness of the plate body in the vicinity of the suspension fixing portion can be effectively improved by the pair of convex portions disposed in the plate body. On the other hand, the strain is likely to be generated in a site in the vicinity of the suspension fixing portion in the bend portion of the plate body. In this point, in the suspension tower plate, the thick portion is disposed between the pair of convex portions in the bend portion, that is, thick portion is in the vicinity of the suspension fixing portion. This can contribute to effectively suppressing the strain from being generated in the site in the vicinity of the suspension fixing portion describe above.

In the suspension tower plate, the thick portion may include a gradually changing portion, wherein a thickness of the thick portion gradually changes in the gradually changing portion.

In the suspension tower plate, since the thickness of the plate body gradually changes in the gradually changing portion disposed in the thick portion of the plate body, stress concentration can be suppressed compared with the case in which the thickness of the plate body rapidly changes.

An aspect of the suspension tower plate includes a plate body being a part of an upper wall portion of a suspension tower of a vehicle, and a suspension fixing portion disposed in the plate body, the suspension fixing portion fixing an upper end part of the suspension and the suspension fixing portion being thicker than a surrounding area.

In the suspension tower plate, the plate body is a part of the upper wall portion of the suspension tower of a vehicle, the suspension fixing portion fixes the upper end part of the suspension. In the suspension fixing portion like this, the strain is likely to be generated by the upward load that is input from the suspension. However, in the suspension tower plate, the suspension fixing portion is formed thicker than the surrounding area thereof. Thus, in the plate body, by forming a site that is particularly likely to generate strain thicker, while suppressing a mass from increasing, the stiffness can be efficiently secured.

The suspension tower plate includes other than a constitution in which the thickness of the plate body made of a sheet metal is increased in the suspension fixing portion, a constitution in which a reinforcement member such as a patch or the like is joined to a constituent site of the suspension fixing portion in the plate body formed of a sheet metal, a constitution in which the plate body is manufactured by die cast and the like.

An aspect of a suspension tower plate includes a plate body being a part of an upper wall portion of a suspension tower of a vehicle, a suspension fixing portion disposed in the plate body suspension fixing portion fixing an upper end part of a suspension, a bend portion disposed on an outer periphery side of the suspension fixing portion in the plate body, and a thick portion disposed in the bend portion, thick portion being thicker than a surrounding area.

In the suspension tower plate, the plate body is a part of an upper wall portion of the suspension tower of the vehicle, the suspension fixing portion fixes the upper end part of the suspension. Further, a bend portion is disposed on an outer periphery side of the suspension fixing portion in the plate body. In a such bend portion, strain is likely to be generated by the upward load that is input from the suspension. However, in the present aspect, a thick portion disposed in the bend portion is formed thicker than the surrounding area thereof. Thus, in the plate body, by forming a site that is particularly likely to generate strain thicker, while suppressing a mass from increasing, the stiffness can be efficiently secured.

The suspension tower plate includes other than a constitution in which the thickness of the plate body made of a sheet metal is increased in the thick portion disposed in the bend portion, a constitution in which a reinforcement member such as a patch or the like is joined to an entirety or a part of a constituent site of the bend portion in the plate body formed of a sheet metal, a constitution in which the plate body is manufactured by die cast and the like.

An aspect of a suspension tower includes a tower body joined to a skeleton member of a vehicle, tower body housing an upper side of a suspension inside tower body; and the suspension tower plate attached to an upper end part of the tower body.

In the suspension tower, the suspension tower plate attached to the upper end part of the tower body is regarded as the suspension tower plate. Therefore, the same operation effect as that of the suspension tower plate can be obtained.

As described above, in the suspension tower plate and the suspension tower according to an aspect of the present invention, the stiffness against the upward load form the suspension can be efficiently secured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a vertical cross-sectional view that shows a cut surface along a F6-F6 line of FIG. 5A and describes a situation when the suspension tower plate according to the comparative example is cross-sectionally deformed by the upward load from the suspension;

DETAILED DESCRIPTION OF EMBODIMENTS

First Embodiment

A suspension tower plate 10, a suspension tower 12, a method of manufacturing the suspension tower plate 10, and a method of manufacturing the suspension tower 12 according a first embodiment of the present invention will be described with reference to FIG. 1 to FIG. 6. An arrow mark FR, an arrow mark UP and an arrow mark OUT that are optionally described in the respective drawings show a vehicle front direction (running direction), an upper direction and an outside in a vehicle width direction, respectively.

(Entire Constitution) Before the suspension tower plate 10 (hereinafter, referred to as a sustower plate 10) that is an essential part of the present embodiment is described, firstly, a peripheral structure of the suspension tower 12 (hereinafter, referred to as a sustower 12) constituted by containing the sustower plate 10 will be described.

Figure 1:
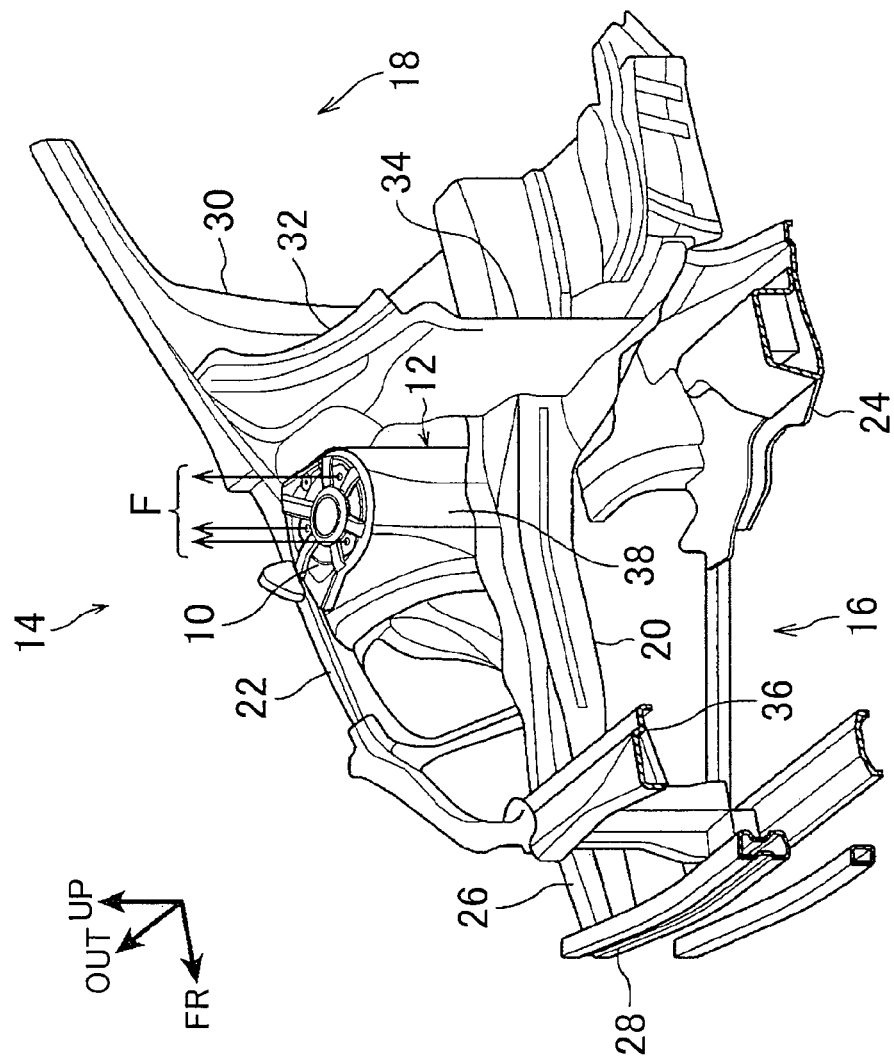
FIG. 1 is a perspective view that shows a constitution of a right half part in a vehicle body front part of an automobile that is constituted by applying a suspension tower plate according to a first embodiment of the present invention.

As shown in FIG. 1, in a vehicle body front part 14 of an automobile constituted by applying the sustower 12, an engine compartment 16 for housing a power unit (not shown) that contains an engine, a motor and the like is formed. The engine compartment 16 is formed on a vehicle front side of a cabin 18. On both left and right side parts in the engine compartment 16, the sustower 12 is disposed respectively. In FIG. 1, although a left half part of the vehicle body front part 14 is omitted from illustrating, the vehicle body front part 14 is basically formed in bilateral symmetry.

A lower end part of the sustower 12 is joined to a front side member 20 and an upper end part of the sustower 12 is joined to an apron upper member 22. The front side member 20 is a skeleton member of a vehicle body with the vehicle front-rear direction being taken as a longitudinal direction and the front side member 20 is disposed on each of both left and right side parts of the engine compartment 16. On a vehicle lower side of the left and right front side members 20, a suspension member 24 that supports a suspension arm of a front suspension (not shown) is disposed. Further, a front end part of each of the left and right front side members 20 is attached to a bumper reinforcement 28 via a crush box 26 as a shock absorption part. The bumper reinforcement 28 is a skeleton member of a vehicle body with a vehicle width direction being taken as a longitudinal direction and the bumper reinforcement 28 is provided between front end parts of the left and right crush boxes 26.

On the other hand, the apron upper member 22 described above is a skeleton member of a vehicle body with the vehicle front-rear direction being taken as a longitudinal direction and the apron upper member 22 is disposed respectively on a vehicle upper side of the left and right front side members 20 and on an outer side in a vehicle width direction. Each of back end parts of the left and right apron upper members 22 is joined to an intermediate part in a vertical direction of each of front pillars 30. A cowl 32 is provided between the left and right front pillars 30, and, a dash panel 34 is disposed on a vehicle lower side of the cowl 32. With the cowl 32 and the dash panel 34, the cabin 18 and the engine compartment 16 are partitioned.

Further, on a vehicle front side of the left and right apron upper member 22, a radiator support 36 that extends in a vehicle width direction is disposed. The radiator support 36 is provided between the front end parts of the left and right front side members 20, and the front end parts of the left and right apron upper members 22 are joined to both end parts in a vehicle width direction in an upper part of the radiator support 36 respectively.

(Essential Parts of the Present Embodiment) Subsequently, the sustower plate 10 that is an essential part of the present embodiment will be described. The sustower plate 10 according to the present embodiment constitutes an upper wall portion of the sustower 12 that supports an upper part of the front suspension and the sustower plate 10 is fixed to an upper end part of a tower body 38 that constitutes a body part (side wall part) of the sustower 12. The tower body 38 is manufactured by pressing a sheet metal material and the tower body 38 is formed into an approximately hat-shaped cross-section (approximately U-shaped cross-section) with an outside in a vehicle width direction opened in a plan view. Inside of this tower body 38, an upper part of the front suspension is housed.

Figure 2:
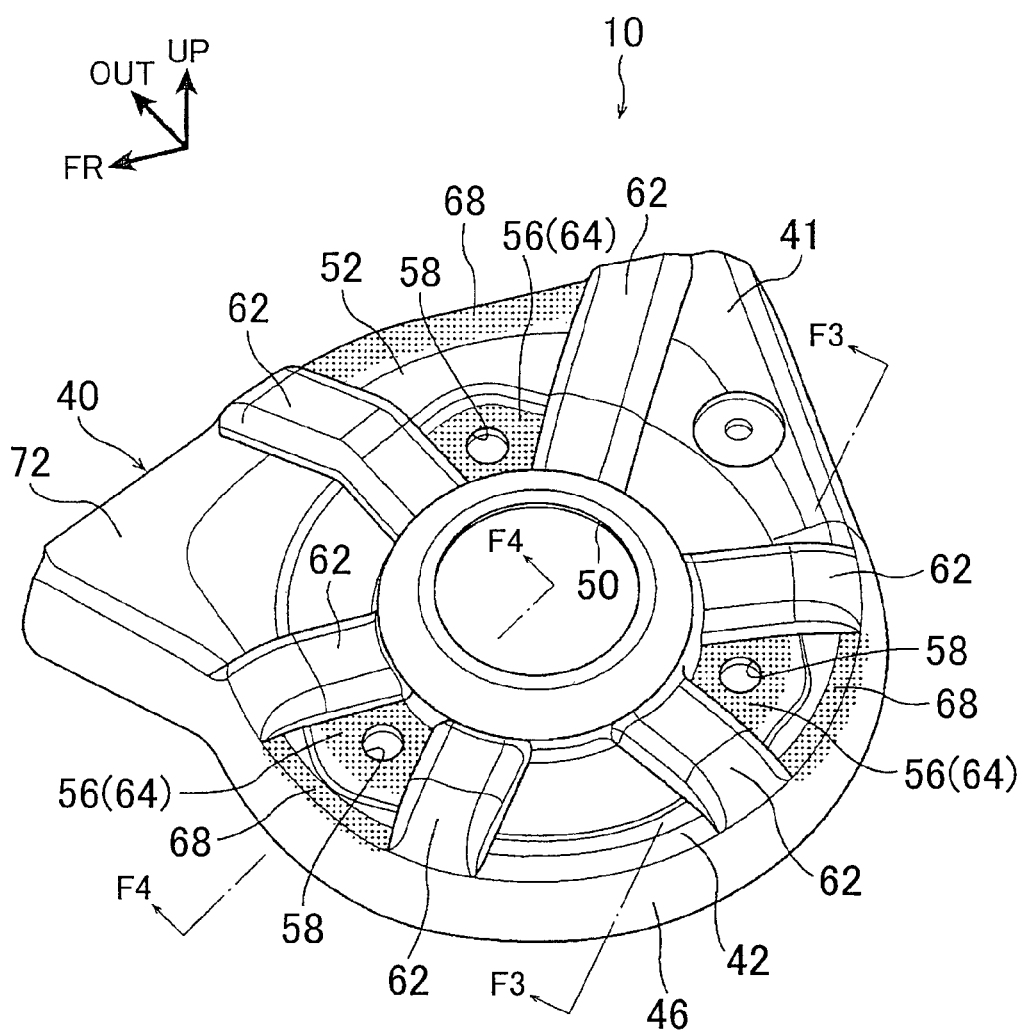
FIG. 2 is a perspective view of the suspension tower plate.

The sustower plate 10 is manufactured by molding a sheet metal having a definite plate thickness according to a plate forging technology and the sustower plate 10 includes, as shown in FIG. 2, a plate body 40 made of a sheet metal. The plate body 40 is formed into an approximate disc shape. In an outer periphery part of the plate body 40, by forming a bend portion 42 that is bent to a lower side, a flange portion 46 that extends to a lower side is formed. The flange portion 46 is superposed on an outer periphery surface of an upper end part of the tower body 38 and the flange portion 46 is joined to the upper end part of the tower body 38 by means of welding and the like. Thus, the plate body 40, that is, the sustower plate 10 is fixed to an upper end part of the tower body 38.

Figure 3:
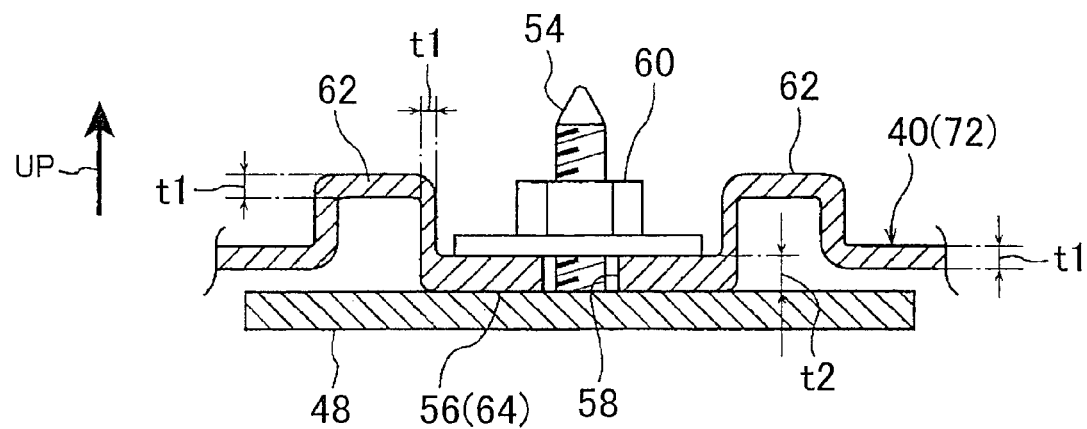
FIG. 3 is an enlarged cross-sectional view that shows a cut surface along a F3-F3 line in FIG. 2 by enlarging.

Further, in a center part of the plate body 40, a circular or nearly circular through-hole 50 is formed at a site that faces a front shock absorber 48 (only an upper end part is shown in FIG. 3) that is provided with the front suspension. A hole edge part of the through-hole 50 is swollen in an approximate L-shaped cross section to an upper side. Further, on an outer side in a vehicle width direction than the through-hole 50 in the plate body 40, a shelf portion 52 that extends along the bend portion 42 is formed, and a center side than the shelf portion 52 in the plate body 40 is formed higher than an outer periphery side.

Further, between the through-hole 50 and the bend portion 42 in the plate body 40, a plurality (here, 3 pieces) of suspension fixing portions 56 (suspension fixing portion) are disposed for fixing a plurality of bolts 54 (here, 3 pieces) that are disposed in an upper end part of the front shock absorber 48. These suspension fixing portions 56 are arranged at equal intervals in a circumference direction of the plate body 40. In each of these suspension fixing portions 56, an insertion hole 58 for inserting the bolt 54 is formed. In each of the bolts 54 inserted into the insertion hole 58, a nut 60 (see FIG. 3) is screwed. Thus, the front shock absorber 48 is fastened and fixed to the sustower plate 10.

Figure 4:
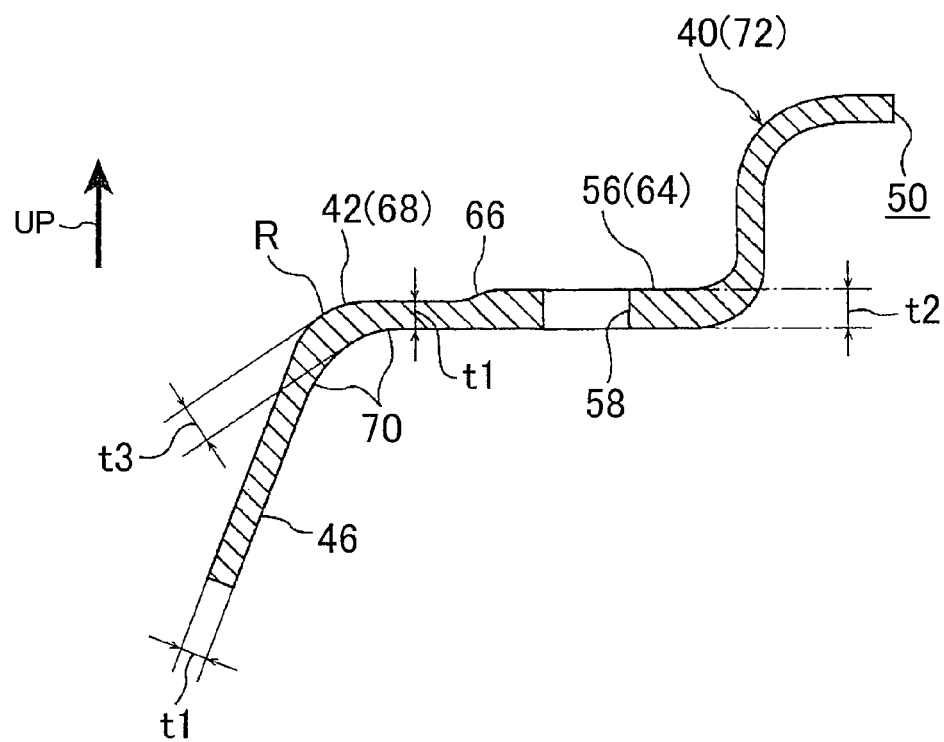
FIG. 4 is an expanded cross-sectional view that shows a cut surface along a F4-F4 line in FIG. 2 by expanding.

Further, in the plate body 40, on sites adjacent to the three suspension fixing portions 56 described above, a plurality (here, 6 pieces) of convex portions 62 are formed. These convex portions 62 are formed by partial upward swelling of the plate body 40 and the convex portions 62 are arranged side by side in a circumference direction of the through-hole 50. These convex portions 62 radially extend to an outer periphery side from a center side of the plate body 40 and the convex portions 62 reach to a ridge line R (see FIG. 4) of the bend portion 42. In FIG. 4, the convex portions 62 are omitted from illustrating.

Each of the convex portions 62 has an approximately inverse U-shaped cross-section opened to a lower side in a cross-section shape seen from an extending direction and has a plurality of ridge lines that extend in a radial direction of the plate body 40. In these convex portions 62, a pair of the convex portions 62 facing each other across the suspension fixing portions 56 i is regarded as a set, paired sets of convex portions 62 are proximately formed such that a space necessary for the fastening and fixing in the respective suspension fixing portions 56 is secured at the minimum level.

Here, in the present embodiment, an entirety of the three suspension fixing portions 56 described above is constituted, as shown in FIG. 3 and FIG. 4, of a thick portion 64 (a thickened part) such that a thickness of the thick portion 64 is thicker than a thickness (plate thickness) of the plate body 40. In FIG. 3 and FIG. 4, t1 represents a thickness dimension of a sheet metal having a definite plate thickness, which is a material of the plate body 40, and t2 that is a thickness dimension of the thick portion 64 (suspension fixing portion 56) is set to be larger than t1 (t2>t1). Each of the thick portions 64 (each of the suspension fixing portions 56) is set to be thicker than the surroundings thereof (adjacent sites of itself). Further, as shown in FIG. 4, at an end part on a flange portion 46 side in each of the thick portions 64, a gradually changing portion 66 is disposed such that a thickness of thick portions 64 gradually increases (changes).

Further, in the present embodiment, each of sites between the pair of convex portions 62 described above in the bend portion 42 is formed into a thick portion 68 by subjecting to a coining process. That is, in the present embodiment, a part of the bend portion 42 (three places separated in a circumference direction of the plate body 40) is formed into the thick portions 68. These thick portions 68 are located on an opposite side from a center part (through-hole 50) of the plate body 40 via each of the suspension fixing portions 56. In these thick portions 68, as shown in FIG. 4, a thickness of the plate body 40 is increased and each of the thick portions 68 is formed thicker than the surroundings thereof (adjacent sites of itself). In FIG. 4, a thickness dimension t3 of the thick portion 68 is set to be larger than the thickness dimension t1 described above (t3>t1). Further, in these thick portions 68, both sides via the ridge line R of the bend portion 42 are regarded as a gradually changing portion 70. In these gradually changing portions 70, a thickness of thick portions 64 gradually increase (change) and the thick portion 68 is formed to be largest in the thickness at a site of the ridge line R.

In FIG. 2, in order to make it easy to understand sites in which thick portions 64 and 68 are disposed in the sustower plate 10, the sites in which the thick portions 64, 68 are disposed are shown with dots. Further, in the sustower plate 10 having the constitution described above, in the plate body 40, sites excluding the bend portion 42, the flange portion 46 (periphery wall part), the suspension fixing portion 56 (thick portion 64) and the convex portion 62 can be grasped as general portions 41 (reference numerals are described only in FIG. 2).

(Operation and Effect) Next, an operation and an effect of the present first embodiment will be described.

According to the first embodiment, during drive of a vehicle, an upward load F (see FIG. 1) from the front shock absorber 48 is input into three suspension fixing portions 56 in the plate body 40 of the sustower plate 10. Further, the upward load F acts on the bend portion 42 disposed on an outer periphery side of the plate body 40. As a result thereof, a strain is likely to be generated in the three suspension fixing portions 56 and the bend portion 42 described above. However, in the present embodiment, in the thick portions 64, 68 disposed in the suspension fixing portion 56 and the bend portion 42, a thickness of the plate body 40, that is a thickness of the thick portion 64, 68, is increased. Thus, in the plate body 40, by forming a site that is particularly likely to generate strain thicker, while suppressing a mass from increasing, the stiffness (so-called stiffness at a point of load application) can be efficiently secured. Thus, the present embodiment can contribute to an improvement in the running stability of a vehicle.

Figure 5A:
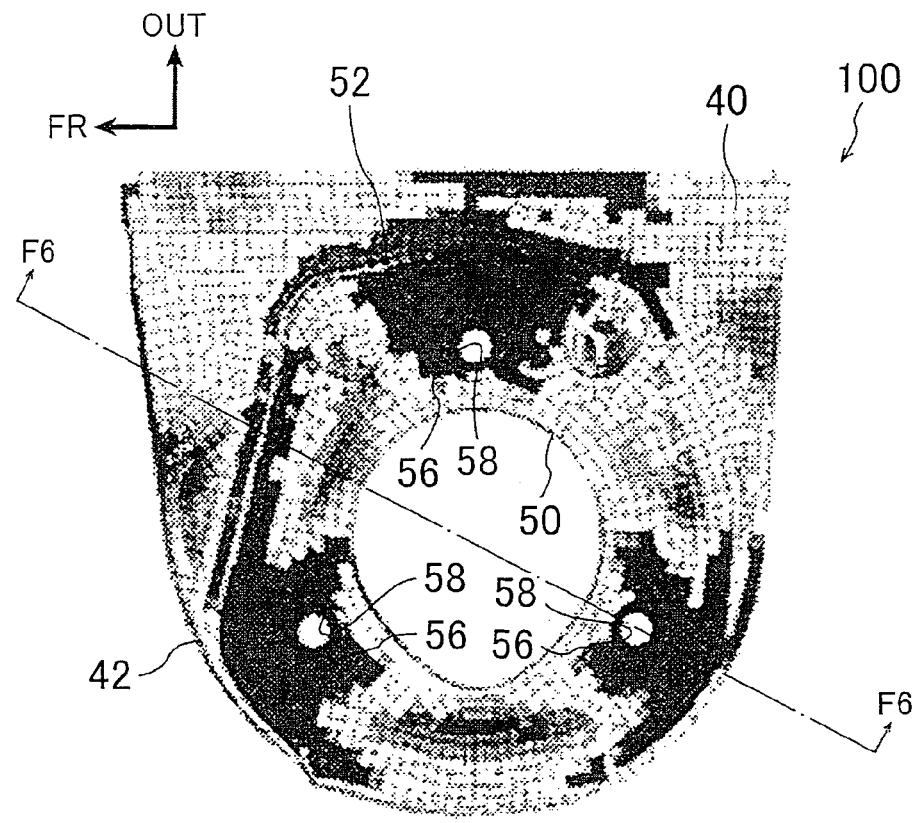
FIG. 5A is a plan view that shows a distribution of strain energy when an upward load from a suspension is input to a suspension tower plate according to a comparative example.
Figure 5B:
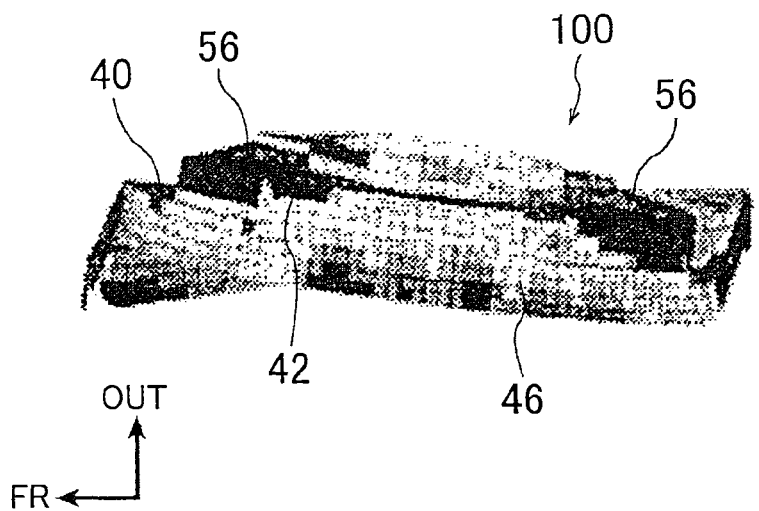
FIG. 5B is a side view that shows a distribution of strain energy when an upward load from the suspension is input to the suspension tower plate according to the comparative example.

The effect described above will be described with reference to comparative examples shown in FIG. 5A, 5B and FIG. 6. In FIG. 5A and FIG. 5B, a distribution of strain energy when the upward load from the suspension is input to a suspension tower plate 100 (hereinafter, referred to as a sustower plate 100) according to a comparative example is shown in a plan view and a side view. Further, in FIG. 6, a state in which the sustower plate 100 is cross-sectionally deformed by the upward load from the suspension is shown in a vertical cross-sectional view. The sustower plate 100 is constituted in the same manner as the sustower plate 10 of the present embodiment except that the thick portions 64, 68 and the convex portion 62 of the present embodiment are not included, and the like members are provided with the same reference numerals.

As shown in FIG. 5A and FIG. 5B, the strain energy described above concentrates in a periphery of three suspension fixing portions 56 of the sustower plate 100, a periphery of three suspension fixing portions 56 in the bend portion 42, and a periphery of the shelf portions 52. When the sustower plate 100 is deformed by this strain energy as shown with a solid line in FIG. 6, in ridge lines of the bend portion 42 (ridge line of the flange portion 46) and the shelf portion 52, an angle change of the plate body 40 becomes larger. When a deformation amount of the sustower plate 100 becomes larger like this, an influence reaches the running stability of a vehicle. In order to dissolve this problem, for example, it is also considered to increase a plate thickness of a sheet metal that is a material of the sustower plate 100 in conformity with the stiffness which a strain energy concentration part requires. However, in that case, by the sheet metal with a definite plate thickness, the stiffness of a place of which strain energy is originally small is increased beyond necessity, and a mass of the sustower plate 100 is increased beyond necessity.

In this regard, in the present embodiment, by paying attention on a distribution of strain energy shown in FIG. 5A and FIG. 5B, a plate thickness (thickness) of a strain energy concentration part partially become thicker. Therefore, the stiffness of the sustower plate 10 can be efficiently secured, and securing of the stiffness and weight saving of the sustower plate 10 can be balanced thereby.

Further, in the present embodiment, the convex portions 62 are disposed adjacent to the respective suspension fixing portions 56 of the plate body 40. In these convex portions 62, since a second moment of area in a thickness direction (vertical direction) of the plate body 40 is increased, surface stiffness of the plate body 40 in the vicinity of the respective suspension fixing portions 56 can be improved. Therefore, the plate body 40 can be effectively suppressed from being deformed due to the upward load F from the front shock absorber 48.

Further, in the present embodiment, on each of both sides of the respective suspension fixing portions 56, the convex portion 62 is disposed. Thus, the surface stiffness of the plate body 40 in the vicinity of the suspension fixing portions 56 can be effectively improved. In other words, since, by the convex portions 62 disposed on both sides of the respective suspension fixing portions 56, the surface stiffness of the plate body 40 can be secured, the thickening in the respective suspension fixing portions 56 can be limited to a minimum level. Further, by proximately forming a pair of the convex portions 62 facing each other across the suspension fixing portion 56 such that a space necessary for fastening and fixing in the suspension fixing portion 56 can be secured at a minimum level, a size of the thick portion 64 is set small. This can effectively suppress a mass from increasing.

Further, in the present embodiment, by the pair of convex portions 62 facing each other across the suspension fixing portion 56, the surface stiffness of the plate body 40 in the vicinity of the suspension fixing portion 56 can be effectively improved. On the other hand, strain is likely to be generated in a site in the vicinity of the suspension fixing portion 56 in the bend portion 42 of the plate body 40. In this regard, in the present embodiment, in the bend portion 42, a site between the pair of the convex portions 62 facing each other across the suspension fixing portion 56, that is, a site in the vicinity of the suspension fixing portion 56 described above is formed with the thick portion 68. Thus, a site in the vicinity of the suspension fixing portion 56 in the bend portion 42 can be effectively suppressed the strain from being generated.

Further, in the present embodiment, in the thick portions 64, 68 of the plate body 40, the gradually changing portions 66, 70 in which a thickness of the the thick portions 64, 68 gradually changes. Therefore, compared with the case in which a thickness of the plate body 40 is rapidly changed, stress concentration can be suppressed from occurring.

Further, in the present embodiment, since the plate body 40 is made of a sheet metal, compared with the case in which the plate body 40 is manufactured by die cast or the like, drastic cost saving can be achieved (for example, a manufacturing cost can be made to one severalth). Further, when the stiffness of the sustower plate 10 is set, since there is no need of considering a structure of the tower body 38 that is a body part of the sustower 12, a degree of freedom of designing the sustower plate 10 and the tower body 38 can be improved.

In the vehicle body front part structure described in a column of the related art, the outer periphery part of the front spring support plate that is bent in a descending slope is superposed with a lower surface of an upper end bend part of the front sustower and joined by welding or the like. Therefore, by the upper end bend part of the front sustower, the outer periphery part of the front spring support plate can be reinforced. However, compared with s constitution in which a thickness of the outer periphery part of the front spring support plate itself is increased (that is, a constitution in which the stiffness is increased by one component of the front spring support plate), an increase rate of a mass associated with an increase of the stiffness becomes high (mass efficiency becomes poor). Further, in the vehicle body front part structure described in a column of the related art, the outer periphery part of the front spring support plate is reinforced over an entire circumference. Therefore, compared with a constitution in which the strain energy concentration part is partially reinforced, the mass increases. On the contrary, when the strain energy concentration part in the front spring support plate is tried to partially reinforce by the upper end bend part of the front sustower, a cutout part or the like has to be disposed in the relevant upper end bend part. In this case, since stress concentrates on the cutout part or the like and the cutout part becomes a start point of deformation, the stiffness of the front spring support plate is difficult to be improved just as planned.

Further, in the front spring support plate described in a column of the related art, in order to effectively improve the surface stiffness (vertical stiffness) while suppressing an increase in the mass, it is preferable to set the convex portion like the present embodiment. However, in that case, the cutout part or the like has to be set to the upper end bend part of the front sustower such that the convex portion of the front spring support plate and the upper end bend part of the front sustower do not interfere with each other. Therefore, also in that case, the problem of stress concentration such as described above occurs.

On the other hand, in the present embodiment, the stiffness of the sustower plate 10 can be set by itself and there is no need of disposing a reinforcement structure for the sustower plate on the tower body 38 side. Therefore, as described above, a degree of freedom of designing the sustower plate 10 and the tower body 38 can be improved.

Next, other embodiments of the present invention will be described. The fundamentally same constitutions and operations as the first embodiment are imparted with the same reference numerals as the first embodiment and description thereof are omitted.

Second Embodiment

Figure 7:
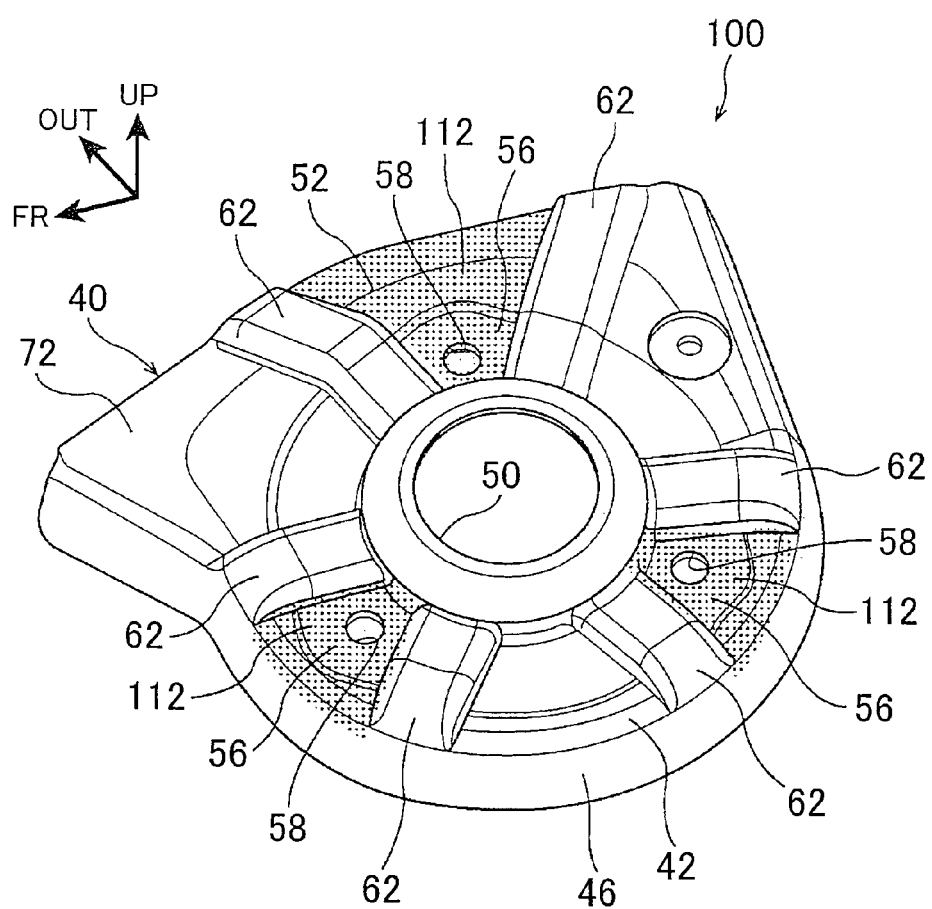
FIG. 7 is a perspective view of a suspension tower plate according to a second embodiment of the present invention.

In FIG. 7, a suspension tower plate 110 according to a second embodiment of the present invention is shown in a perspective view. In the suspension tower plate 110, a site between a pair of convex portions 62 facing each other across the suspension fixing portion 56 is formed into a thick portion 112. That is, in a site between the pair of convex portions 62, the suspension fixing portion 56, the bend portion 42, and a site between the suspension fixing portion 56 and the bend portion 42 are constituted of the thick portion 112. In the thick portion 112, a thickness of thick portion 112 is increased. Constitutions other than the above are the same as the first embodiment.

In this suspension tower plate 110, since all of sites between the pair of convex portions 62 facing each other across the suspension fixing portion 56 is formed into the thick portion 112, the stiffness to the upward load from the front shock absorber 48 can be more effectively improved.

Third Embodiment

Figure 8:
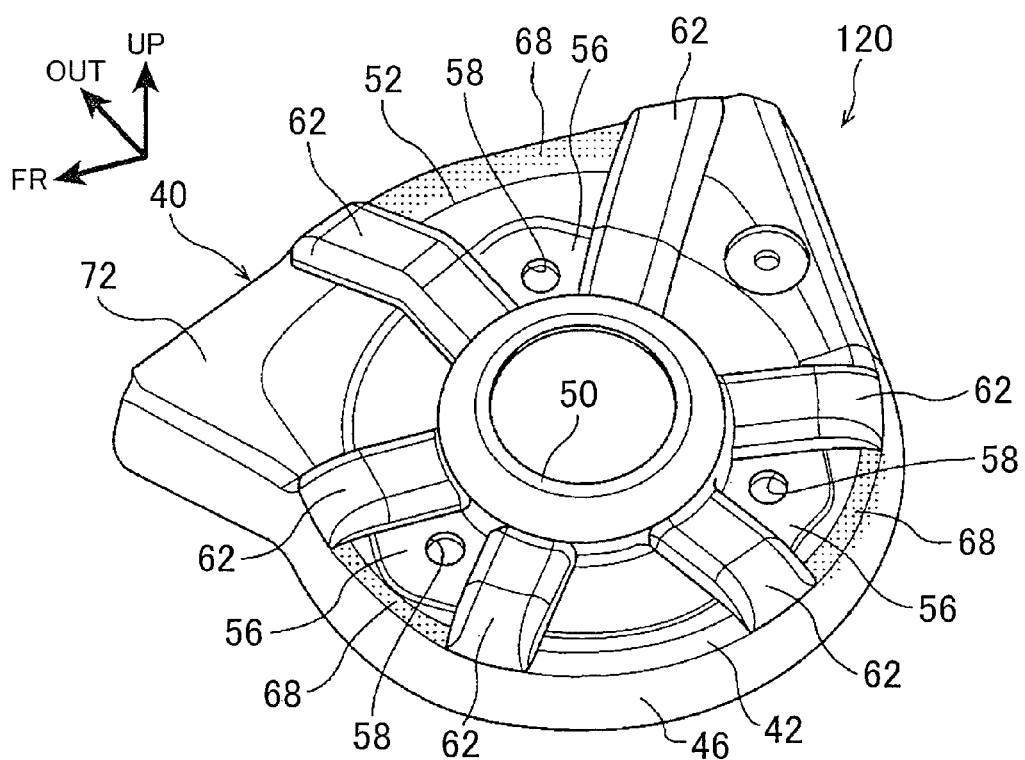
FIG. 8 is a perspective view of a suspension tower plate according to a third embodiment of the present invention.

In FIG. 8, a suspension tower plate 120 according to a third embodiment of the present invention is shown in a perspective view. The suspension tower plate 120 is constituted in the same manner as the first embodiment except that the suspension fixing portion 56 is not constituted of the thick portion 64.

In this suspension tower plate 120, in place of not constituting the suspension fixing portion 56 with the thick portion 64, with the pair convex portions 62 facing each other across the suspension fixing portion 56, the stiffness of the suspension fixing portion 56 and the surface stiffness of the plate body 40 are secured. Thus, weight saving can be achieved.

Fourth Embodiment

Figure 9:
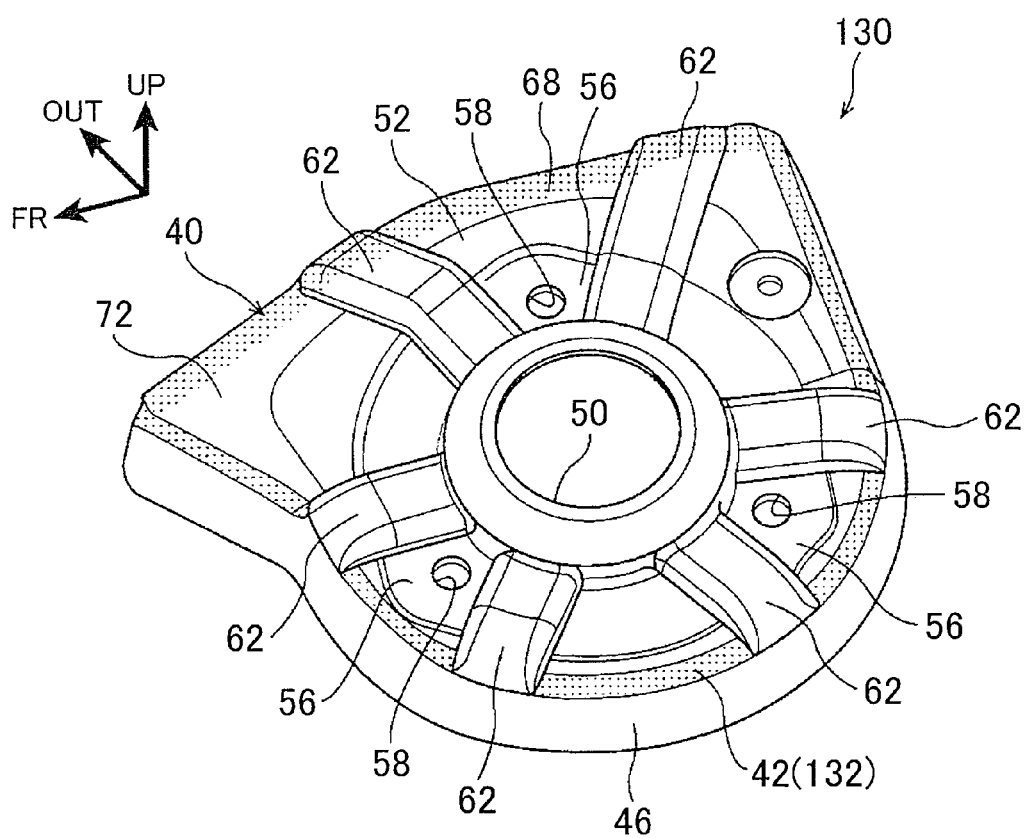
FIG. 9 is a perspective view of a suspension tower plate according to a fourth embodiment of the present invention.

In FIG. 9, a suspension tower plate 130 according to a fourth embodiment of the present invention is shown in a perspective view. In this suspension tower plate 130, similarly as the second embodiment, the suspension fixing portion 56 is not constituted of the thick portion 64. Further, in this embodiment, an entirety of the bend portion 42 is constituted of a thick portion 132 and the thick portion 132 is formed over an entire circumference of the plate body 40. In the thick portion 132, a thickness of the thick portion 132 is increased. In FIG. 9, a dotted part is the thick portion 132.

In this suspension tower plate 130, an entirety of the bend portion 42 is formed into the thick portion 132. Therefore, a deformation that starts from the bend portion 42 can be more effectively suppressed.

Complementary Description of Embodiment

In the respective embodiments, a constitution in which the convex portions 62 are disposed on both sides of the suspension fixing portion 56 in a circumference direction of the plate body 40 is employed. However, the present invention is not restricted thereto, and a constitution in which the convex portion 62 is disposed on one side of the suspension fixing portion 56 in a circumference direction of the plate body 40 may be employed.

Further, in the respective embodiments, a constitution in which a plurality of the convex portions 62 radially extend from a center side to an outer periphery side of the plate body 40 is employed. However, the present invention is not restricted thereto. For example, a constitution in which the pair of convex portions 62 facing each other across the suspension fixing portion 56 extend in a parallel way may be employed.

Further, in the respective embodiments, a constitution in which, in the thick portion 64, the thick portion 68 and the thick portion 112, a thickness of the plate body 40, that is a thickness of thick portion 64, 68, 112, made of a sheet metal is increased is employed. However, the present invention is not restricted thereto. For example, a constitution in which a reinforcement member such as a patch or the like is joined to a constitutional site of the suspension fixing portion 56 in the plate body 40 made of a sheet metal or a constitution in which the suspension fixing portion 56 is molded thicker by manufacturing the plate body 40 by die cast may be employed. Further, for example, a constitution in which a reinforcement member such as a patch or the like is joined to an entirety or a part of a constitutional site of the bend portion 42 in the plate body 40 made of a sheet metal or a constitution in which an entirety or a part of the bend portion 42 is formed thicker by manufacturing the plate body 40 by die cast may be employed.

Further, in the respective embodiments, a constitution in which an entirety or a part of the convex portion 62 is formed into a thin part in which a thickness of the plate body 40 is reduced may be employed. That is, in the convex portion 62 in which at a place distanced from a neutral axis a thickness can be secured, since a second moment of area increases, even when a thickness is reduced by that portion, the stiffness can be secured. Thus, the weight saving can be efficiently achieved.

Other than the above, the present invention can be carried out by variously changing within a range that does not deviate from the gist of the present invention. Further, it goes without saying that a scope of rights of the present invention is not restricted to the respective embodiments described above.

The invention claimed is:

1. A suspension tower plate comprising:
   - a plate body made of a sheet metal, the plate body being a part of an upper wall portion of a suspension tower of a vehicle, the plate body having a first thickness throughout the plate body;
   - a plurality of suspension fixing portions disposed in the plate body, the plurality of suspension fixing portions fixing to an upper end part of a suspension;
   - a bend portion disposed on an outer periphery side of the suspension fixing portion in the plate body;
   - a thick portion being an entirety or a part in at least one of: (i) the suspension fixing portion and (ii) the bend portion, the thick portion being thicker than the first thickness; and
   - a pair of inverted channel portions corresponding to each of the plurality of suspension fixing portions, each pair of inverted channel portions extending from a center side of the plate body to an outer periphery side, the pair of inverted channel portions facing each other on adjacent sides of the corresponding suspension fixing portion.

2. The suspension tower plate according to claim 1, wherein the thick portion is disposed between the pair of inverted channel portions in the plate body.

3. The suspension tower plate according to claim 1, wherein the pair of inverted channel portions extend to the bend portion and the thick portion is disposed between the pair of inverted channel portions in the bend portion.

4. The suspension tower plate according to claim 1, wherein the thick portion includes a gradually changing portion, wherein a thickness of the thick portion gradually changes in the gradually changing portion.

5. A suspension tower plate comprising;
   - a plate body being a part of an upper wall portion of a suspension tower of a vehicle; and
   - a suspension fixing portion disposed in the plate body, the suspension fixing portion fixing to an upper end part of a suspension, the suspension fixing portion being thicker than surrounding areas radially inward and radially outward of the suspension fixing portion, and surrounding areas laterally adjacent to the suspension fixing portion.

6. A suspension tower plate comprising:
   - a plate body being a part of an upper wall portion of a suspension tower of a vehicle;
   - a suspension fixing portion disposed in the plate body, the suspension fixing portion fixing to an upper end part of a suspension;
   - a bend portion disposed on an outer periphery side of the suspension fixing portion in the plate body; and
   - a thick portion disposed in the bend portion, the thick portion being thicker than surrounding areas radially inward and radially outward of the bend portion, and surrounding areas laterally adjacent to the bend portion disposed on an outer periphery side of the suspension fixing portion.

7. A suspension tower comprising:
   - a tower body joined with a skeleton member of a vehicle, the tower body housing an upper part side of a suspension inside the tower body; and
   - the suspension tower plate according to claim 1, the suspension tower plate being attached to an upper end part of the tower body.

* * * * *